United States Patent [19]
Kohno

[11] Patent Number: 4,858,708
[45] Date of Patent: Aug. 22, 1989

[54] COMBINATORIAL WEIGHING APPARATUS

[75] Inventor: Masami Kohno, Kyoto, Japan

[73] Assignee: Ishida Scales Mfg. Co. Ltd., Kyoto, Japan

[21] Appl. No.: 243,277

[22] Filed: Sep. 12, 1988

[30] Foreign Application Priority Data

Sep. 11, 1987 [JP] Japan .................................. 62-226681

[51] Int. Cl.⁴ ..................... G01G 13/00; G01G 13/16; B65G 11/00
[52] U.S. Cl. ................................. 177/25.18; 177/59; 193/2 R
[58] Field of Search ............. 177/25.18, 59; 193/2 R, 193/22, 23

[56] References Cited

U.S. PATENT DOCUMENTS

| | | | |
|---|---|---|---|
| 4,538,693 | 9/1985 | Klopfenstein et al. | 177/25.18 |
| 4,623,056 | 11/1986 | Flaugher | 193/23 |
| 4,657,129 | 4/1987 | Mikami | 193/2 R |
| 4,678,047 | 7/1987 | Kataoka et al. | 177/25.18 X |

*Primary Examiner*—George H. Miller, Jr.
*Attorney, Agent, or Firm*—Staas & Halsey

[57] ABSTRACT

A combinatorial weighing apparatus has chutes for distributing articles selected and discharged by combinatorial weighing operation to prescribed discharge positions. At least one means is coupled to the chutes for distributing articles discharged from weighing hoppers in a plurality of directions. A plurality of timing hoppers are provided which are capable of temporarily storing the articles distributed by the distributing means. Article receiving means is disposed for receiving the articles which have passed through paths selected by control means. The timing hoppers may temporarily store the articles to reduce the speed at which the articles pass.

6 Claims, 5 Drawing Sheets

COMBINATORIAL WEIGHING APPARATUS

BACKGROUND OF THE INVENTION

1. Field of the Invention:

The present invention relates to a combinatorial weighing apparatus for producing a pack containing a number of articles of merchandise which have a total weight equal to a prescribed weight.

2. Description of the Prior Art:

As the standard of living becomes higher, more kinds of articles of merchandise, such as foods, in small and great quantities are found in the market and sold in various manners.

In supermarkets or the like, such articles of merchandise are not sold separately at random, but sold in packages of measured quantities so that they can easily be handled by the retailers and consumers. The measured quantities may be measured numbers or weights of articles.

In weighing articles to be sold, it is necessary that the measured weight should not be smaller than a prescribed weight which the consumer desires. However, any measured weight much larger than a prescribed weight is undesirable for the retailer. Therefore, it is ideal weighing practice to obtain a measured weight which is equal to a prescribed weight or approximates such a prescribed weight plus a minimum overweight. There has been a demand for measuring technology that articles be processed quickly and in large quantities according to such weighing operation. As disclosed in earlier applications assigned to the applicant, combinatorial measuring operation has been developed which is based on the theory of probability and statistics and high-speed computerized calculations, and which is improved for high-speed processing.

According to one combinatorial measuring process, articles after they have been processed by combinatorial measuring operation are packaged in bags of polyethylene. In many cases, measured articles are simply put into bags and packaged. Japanese Laid-Open Utility Model Publication No. 59-6732 and U.S. Pat. No. 4,553,617, however, disclose a procedure in which articles are weighed to meet a prescribed weight, and a prescribed number of such articles are charged into a package tray.

The conventional combinatorial weighing apparatus have a collection chute with a single lower discharge port. In order to charge articles into an array of package trays extending transversely to the direction in which they are fed, the collection chute has to be moved along the array of package trays as many times as the number of package trays. Therefore, a complex mechanism is needed to move the collection chute, and a frame and components of the apparatus having such a complex mechanism are large in size, resulting in a large-size apparatus. The large-size combinatorial weighing apparatus takes up a large space, and the well-balanced arrangement of the combinatorial weighing apparatus and surrounding devices operable in coaction therewith is difficult to achieve. Initial assembly and maintenance such as inspection, servicing, and the like of the apparatus are also difficult to accomplish. The combinatorial weighing apparatus produces vibration and large noise, and requires high initial and running costs.

In the above conventional combinatorial weighing apparatus, moreover, articles are caused to drop from weighing hoppers to package trays without substantial resistance. There is no problem with hard articles which will not be broken if they drop from the weighing hoppers through the collection chute into the package trays. However, soft articles may be collapsed by the shock when they impinge upon the package trays.

SUMMARY OF THE INVENTION

It is an object of the present invention to provide a combinatorial weighing apparatus which has a combinatorial weighing capability, is of a compact structure, and is capable of directly charging weighed articles from weighing hoppers into package trays, or of braking articles as they drop from the weighing hoppers into the package trays.

To achieve the above object, according to the present invention, a dispersion table is disposed upwardly of the center of an apparatus frame, and a number of radial troughs are disposed around the peripheral edge of the dispersion table, the radial troughs being disposed above an annular pattern of as many pool hoppers as the number of weighing heads. Weighing hoppers are connected to the lower ends of the pool hoppers and supported on weight detectors such as load cells. An inverted tapered conical collection chute is positioned below the weighing hoppers of the weighing heads, and timing hoppers are disposed at the lower end of the collection chute, thus making up a combinatorial weighing apparatus. Distribution chutes in a plurality of vertical stages are disposed below the collection chute, the distribution chutes having horizontal distribution directions which are 90° spaced. A conveyor is disposed below the lowermost stage of distribution chutes for feeding packages such as package trays having a plurality of storage recesses defined by partition walls.

Frozen articles of merchandise such as pieces of "wang ton" (Chinese flour dumplings with pork in them, served in soup) are supplied onto the dispersion table, which is three-dimensionaly vibrated to feed the articles into the radial troughs and then the pool hoppers at the radially outer distal ends of the radial troughs. The articles are then charged into the weighing hoppers at prescribed timing, and the weights of the charged articles are detected by the load cells and input to a microcomputer, which then calculates the data at a high speed to find a combination of articles that has a weight equal to a prescribed weight or approximating such a prescribed weight plus a minimum overweight value. The lids of those weighing hoppers which give such an article combination are opened to charge the articles into the collection chute. The articles sliding down the collection chute are delivered through the distribution chutes in the vertically spaced stages and openable and closable shutters, in an intermittent mode or a straight supply mode, into a package such as a package tray fed by the conveyor. The articles as they are supplied to the package, they are supplied in a desired one of the modes without causing vibration.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 5:
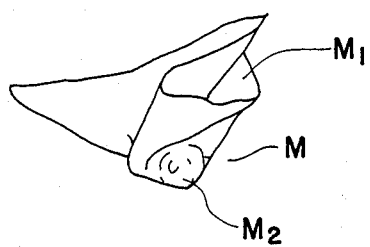
FIG. 5 is a perspective view of an article.

In the embodiment of the present invention, which will be described below, articles to be weighed are "wang ton" which is generally shaped as shown in FIG. 5. The "wang ton" M contains minched pork therein and wrapped by a thin layer M1 of wheat flour kneaded with water. The minched pork is wrapped in a buldging portion M2 in the lower region of the thin layer M1. The "wang ton" is normally boiled in water and then served in soup.

At the food selling corner or counter in a supermarket, "wang ton" is sold as "raw wang ton" containing raw pork meat wrapped in a raw thin layer made of kneaded wheat flour, or as a frozen form of such "raw wang ton", or as boiled "wang ton", or as a frozen form of such boiled "wang ton", with a prescribed number of such "wang ton" pieces being packed in a plastic package tray.

Figure 1:
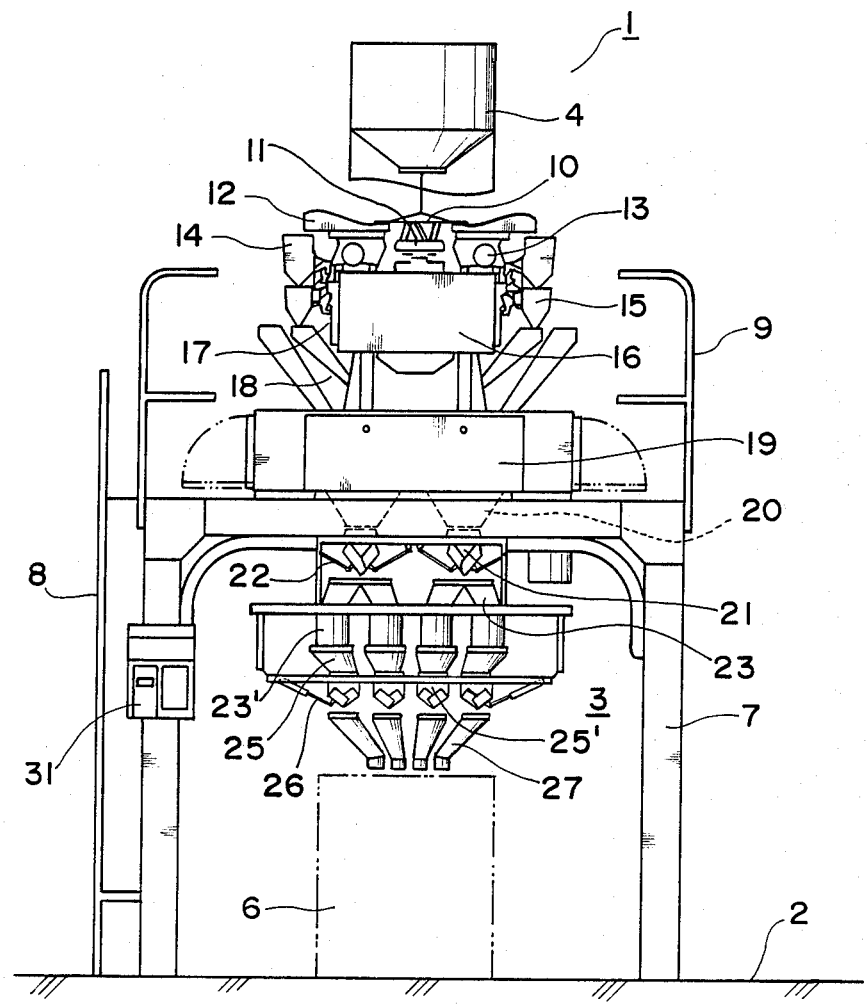
FIG. 1 is a schematic front elevational view of a combinatorial weighing apparatus according to the present invention.
Figure 2:
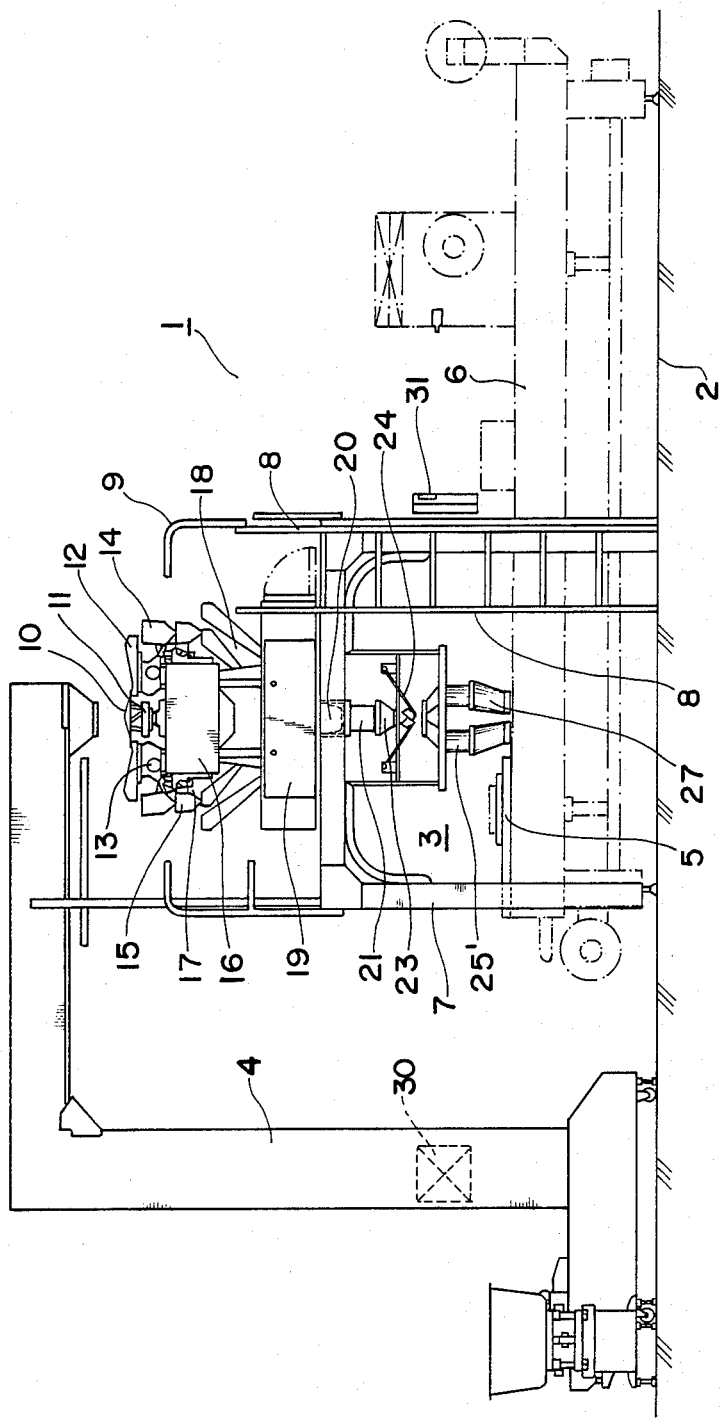
FIG. 2 is a side elevational view of the combinatorial weighing apparatus.
Figure 3:
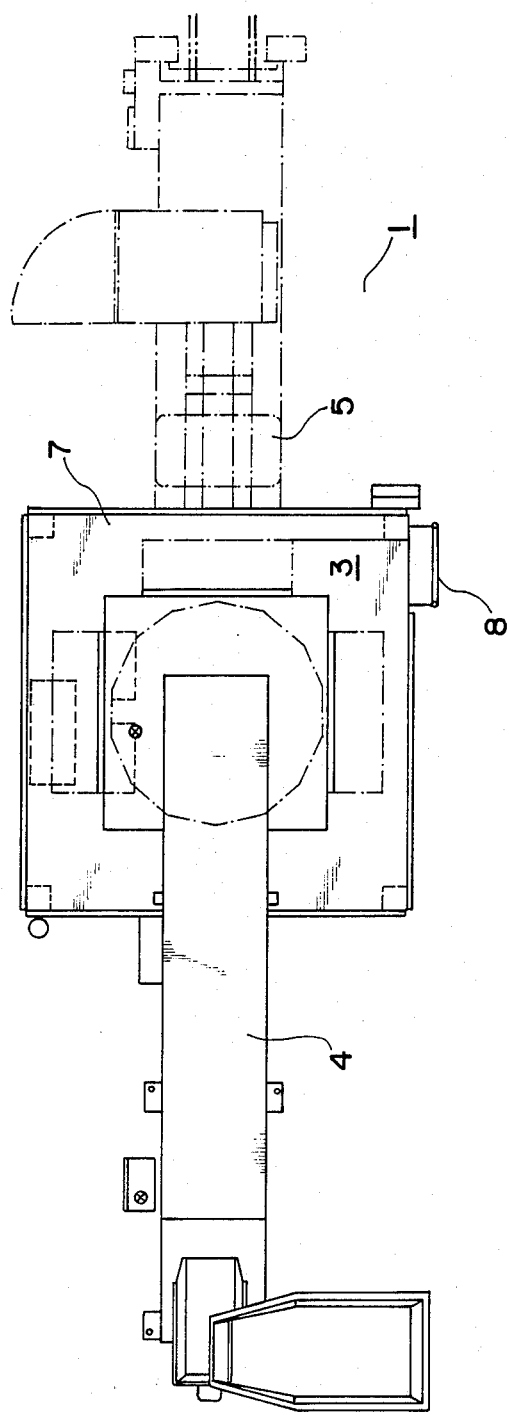
FIG. 3 is a plan view of the combinatorial weighing apparatus.
Figure 4:
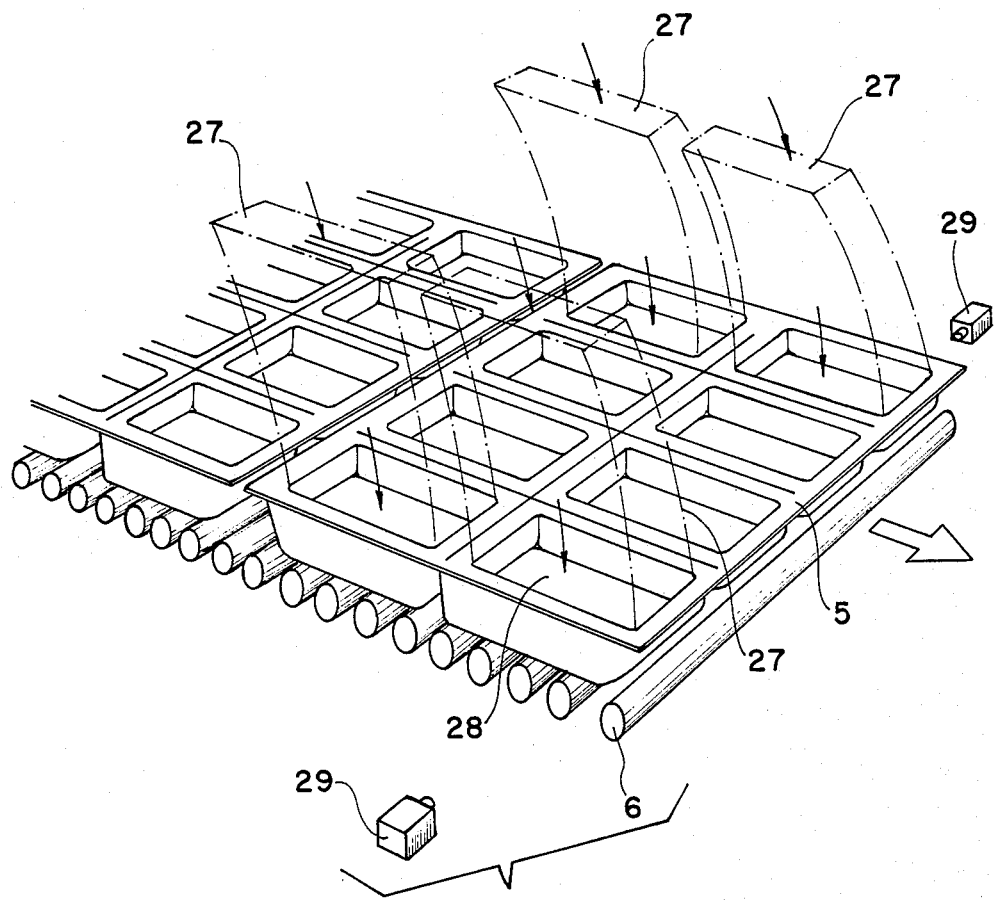
FIG. 4 is a perspective view of lowermost distribution chutes and package trays.

As shown in FIGS. 1 and 2, a combinatorial weighing apparatus 1 comprises a main apparatus assembly 3 mounted on a base 2, a bucket conveyor 4 disposed above the main apparatus assembly 3, and a roller conveyor 6 for successively supplying package trays 5 (FIGS. 2 and 4). The main apparatus assembly 3 includes a frame 7 including a ladder 8 for use in inspecting or servicing the apparatus 1 and guards 9.

A dispersion table 10 is mounted on an electromagnetic three-dimensional vibrator 11 disposed upwardly of the center of the frame 7. A number of as many radial troughs 12 as the number of weighing heads are disposed around the dispersion table 10 and on respective radial electromagnetic vibrators 13.

The radial troughs 12 have radially outer distal ends disposed respectively above as many pool hoppers 14 arranged in a circular pattern as the number of the weighing heads. Weighing hoppers 15 mounted on respective load cells (not shown) are connected to the lower ends of the pool hoppers 14, respectively. The pool hoppers 14 and the weighing hoppers 15 jointly serve as the weighing heads for detecting the weight of "wang ton" pieces, and have their lids openable and closable via a link mechanism 17 by a driver 16 disposed centrally on the frame 7.

Each of the weighing hoppers 15 has two inner and outer lids on its lower end. When the inner lid is opened, the weighed "wang ton" pieces are discharged inwardly, and when the outer lid is opened, the weighed "wang ton" pieces are discharged outwardly.

A collection chute 18 is disposed below the circularly arranged weighing hoppers 15 for collecting the "wang ton" pieces discharged from the weighing hoppers 15. Although not shown in detail in FIGS. 1 and 2, the collection chute 18 comprises two larger and smaller collectors of funnel shape, the smaller collector being located within the larger collector. The outer collector serves to collect the "wang ton" pieces discharged when the outer lids of the weighing hoppers 15 are opened, and to direct the "wang ton" pieces into a first distribution device 19, from which they are discharged into one distribution chute 20. The inner collector serves to collect the "wang ton" pieces discharged when the inner lids of the weighing hoppers 15 are opened, and to direct the "wang ton" pieces via a different route into the first distribution device 19, from which they are discharged into another distribution chute 20. The collection chute 18 is of an ordinary construction and may be of a design disclosed in detail in U.S. Pat. No. 4,520,884.

The main apparatus assembly 3 of the combinatorial weighing apparatus 1 described so far is substantially the same as a conventional combinatorial weighing apparatus having an annular array of weighing heads. The above combinatorial weighing apparatus does not have a memory hopper for temporarily storing weighed articles discharged from the weighing hoppers and storing the weight value of the stored articles in a control unit of the combinatorial weighing apparatus. However, such a memory hopper may be provided in the above combinatorial weighing apparatus within the knowledge of one skilled in the art.

Timing hoppers 21 are connected respectively to the lower ends of the first distribution chutes 20. Each of the timing hoppers 21 has two openable and closable shutters 21', 21" which are openable and closable by respective air cylinders 22. As better shown in FIG. 6, second bifurcated distribution chutes 23 are disposed below the respective timing hoppers 21. Therefore, a group of "wang ton" pieces discharged from those weighing hoppers 15 which are selected in one combinatorial weighing cycle are distributed into four zones by the first and second distribution chutes 20, 23 through selection opening and closing of the lids of the timing hoppers 21.

Figure 6:
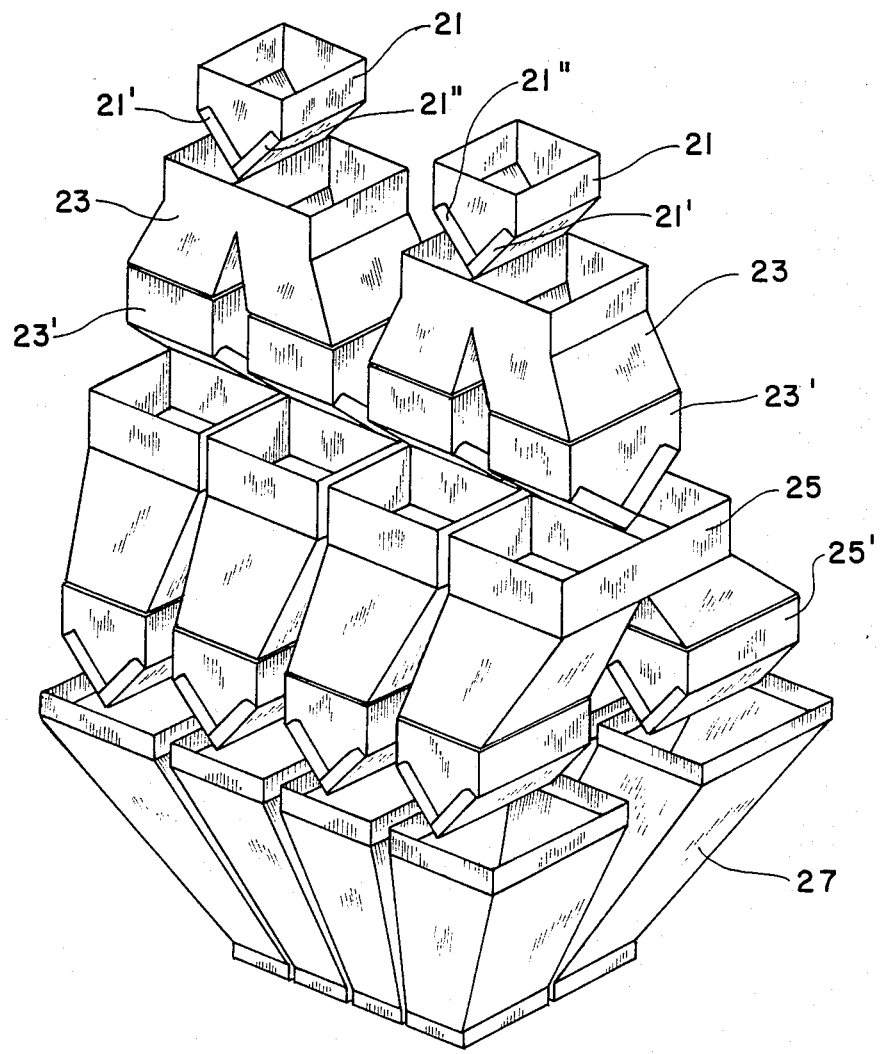
FIG. 6 is a perspective view of a ditribution system.

As shown in FIG. 6, timing hoppers 23' are disposed below the distribution chutes 23, the timing hoppers 23' having openable and closable shutters operable by air cylinders 24 as shown in FIG. 2.

Third bifurcated distribution chutes 25 are disposed beneath the timing hoppers 23'. Therefore, a group of "wang ton" pieces discharged from the selected weighing hoppers 15 are distributed into eight zones by selectively opening and closing the lids of the timing hoppers 21, 23'.

Thus, the selected and discharged "wang ton" pieces are divided into two zones by the distribution chutes 20, four zones by the distribution chutes 23, and eight zones by the distribution chutes 25. Guide chutes 27 are disposed below the final timing hoppers 25' for engagement in storage recesses 28 (FIG. 5) in a package tray 5 that is fed by the roller conveyor 6. The laterally outermost timing hoppers 25' associated with the distribution chutes 25 are coupled to air cylinders 26, and inner timing hoppers 25' are interlinked by link rods (not shown), so that the timing hoppers 25' can be opened and closed in synchronism. The opening and closing operation of the timing hoppers 21, 23', 25' is controlled by a control unit comprising a microcomputer (not shown).

The distribution chutes 20, 23, 25 are vertically arranged in the order of the values of their reference numerals. The directions in which the "wang ton"

pieces are discharged from the timing hoppers 21, 23', 25' are successively 90° spaced.

In FIG. 4, a pair of photoelectric sensors 29 is provided for detecting when the leading end of the package tray 5 is fed by the roller conveyor 6 to reach the position of the sensors 29, whereupon the final timing hoppers 25' are all opened by the air cylinders 26 for charging the "wang ton" pieces M into the storage recesses 28 in the package tray 5.

Denoted at 30, 31 in FIG. 2 are control panels.

In operation, when frozen and hence solidified "wang ton" pieces are successively delivered by the bucket conveyor 4 and supplied onto the distribution table 11 on the upper end of the main apparatus assembly 3, the "wang ton" pieces M are distributed in all directions by the distribution table 10 which is three-dimensionally vibrated by the electromagnetic vibrator 13, and supplied across the outer peripheral edge of the distribution table 10 into the radial troughs 12. Since the radial troughs 12 are radially vibrated by the electromagnetic vibrators 13, the "wang ton" pieces are then charged into the pool hoppers 14.

In the pool hoppers 14, the lids thereof are opened at prescribed timing by the link mechanism 17 to charge the "wang ton" pieces M into the weighing hoppers 15. The "wang ton" pieces M supplied to the weighing hoppers 15 are weighed by the load cells, and the detected weights are input to the microcomputer, which then calculates the data at a high speed to find a combination of those weighing heads which gives a weight equal to a prescribed weight or approximating such a prescribed weight plus a minimum overweight. Then, the lids of the weighing hoppers 15 of the weighing heads in the combination are opened by the driver 16 and the link mechanism 17 to charge the "wang ton" pieces M into the collection chute 18.

The supplied "wang ton" pieces M are then divided into two groups and supplied into the distribution chutes 20 by the first distribution device 19. Then, the lids 21', 21" of the timing hoppers 21 are selectively opened by the air cylinders 22 operating at prescribed timing to divide the "wang ton" pieces M into four groups in the second distribution chutes 23, and then the "wang ton" pieces M are divided into eight groups in the third distribution chutes 25 by the arrangement shown in FIG. 6. The "wang ton" pieces M are thus charged into the timing hoppers 25'. After all of the timing hoppers 25' are supplied with "wang ton" pieces M, a package tray 5 is delivered by the roller conveyor 6 to a position below the guide chutes 27. Upon detection by the photoelectric sensors 29 of the leading end of the package tray 5, the final air cylinders 26 are simultaneously operated to allow the "wang ton" pieces M stored in the timing hoppers 25' to fall through the guide chutes 27 into the storage recesses 28 in the package tray 5.

Therefore, eight groups of "wang ton" pieces M which are successively obtained by eight weighing cycles are supplied into the storage recesses 28 in the package tray 5 in one supply cycle, after which the package tray 5 is delivered to a next processing station.

Since the timing hoppers 21, 23', 25' of the distribution chutes 20, 23, 25 are capable of temporarily storing "wang ton" pieces M, the "wang ton" pieces M as they are divided into eight groups by the three stages of the distribution chutes 20, 23, 25 are prevented from falling directly from the timing hoppers 21, 23', 25' along straight paths via the guide chutes 27 into the package tray 5. Therefore, the "wang ton" pieces M are not damaged, and even if the "wang ton" pieces M are frozen and hard, their peripheral edges are prevented from being broken or the pork meat is prevented from coming out of the wrapping layer.

Where the "wang ton" pieces M are wet and soft, they are not broken or damaged. Therefore, the selected air cylinders 22, 24, 26 are kept in a contracted condition at all times to allow the "wang ton" pieces M to be supplied from the collection chute 18 via straight paths into the storage recesses 28 in the package tray 5.

Inasmuch as the distribution chutes 20, 23, 25 distribute "wang ton" pieces in 90°-spaced horizontal directions, their dimensions in the vertical and horizontal directions are minimized, and the apparatus is of a compact construction.

The present invention is not limited to the illustrated embodiment. The distribution chutes at the different stages may be associated with photoelectric sensors for counting "wang ton" pieces M as they pass through the distribution chutes.

Other articles of merchandise than "wang ton" may be weighed by the combinatorial weighing apparatus of the present invention.

The roller conveyor 6 may be replaced with a belt conveyor.

Packages to be fed by the conveyor 6 may be bags rather than package trays.

Articles to be processed may be intermittently supplied to packages by being cushioned and braked by the temporary storage capability of the timing hoppers 21, 23', 25', or may be supplied to packages along straight paths, or may be supplied by a combination of such braking and straight supplying modes.

With the present invention, as described above, the distribution chutes are disposed below the collection chute in the combinatorial weighing apparatus for supplying articles of merchandise to a package which is fed by the conveyor. The distribution chutes are not required to be laterally moved, and the apparatus is prevented from producing vibration and noise, and its durability is greatly increased. The distribution chutes at a plurality of stages have openable and closable shutters for temporarily storing the articles. Therefore, the articles may be temporarily stored or allowed pass along straight paths. Since the articles can thus be supplied in selectable modes to the packages, the apparatus is flexible in operation.

The distribution chutes are angularly equally spaced by 90° in horizontal directions successively at the vertically different stages. The apparatus dimensions are therefore minimized, and compact in overall size. Consequently, the apparatus can initially be installed, and then inspected and serviced with high efficiency. The articles to be processed by the apparatus can be supplied in a mode best suited to the articles by selecting an intermittent supply mode or a continuous rapid supply mode dependent on the hardness or softness of the articles. Therefore, the value of the articles is no lowered by the apparatus, and hence the reliability of the apparatus is not lost.

Although a certain preferred embodiment has been shown and described, it should be understood that many changes and modifications may be made therein without departing from the scope of the appended claims.

What we claim is:

1. A combinatorial weighing apparatus having chutes for distributing articles selected and discharged by combinatorial weighing operation to prescribed discharge positions, said combinatorial weighing apparatus comprising:
   at least one distribution chute coupled to said chutes and having means for distributing articles discharged from weighing hoppers in a plurality of directions;
   a plurality of timing hoppers capable of temporarily storing the articles distributed by said distribution chute;
   article receiving means disposed downstream of said timing hoppers for receiving the articles discharged from said timing hoppers; and
   control means for controlling a sequence in which the articles are distributed by said distribution chute.

2. A combinatorial weighing apparatus according to claim 1, further including at least one article distributing means disposed downstream of said timing hoppers positioned in divided paths from said distribution chute, said article distributing means comprising distribution chutes and a plurality of timing hoppers capable of temporarily storing the articles distributed by said last-mentioned distribution chutes, said article receiving means having means for receiving the articles discharged from said timing hoppers of said article distributing means.

3. A combinatorial weighing apparatus according to claim 2, wherein said distribution chutes has means for distributing the articles in 90° spaced directions as viewed in plan.

4. A combinatorial weighing apparatus according to claim 1, 2, or 3, further including stop means disposed in selected paths defined by each said distribution chute along which the articles pass, for reducing the speed at which the articles pass.

5. A combinatorial weighing apparatus according to claim 4, wherein said stop means comprises means associated with each said distribution chute for temporarily storing the articles.

6. A combinatorial weighing apparatus according to claim 1, 2, or 3, further including guide chutes disposed above said article receiving means for temporarily storing the articles and simultaneously discharging the stored articles.

* * * * *